United States Patent

Kobayashi et al.

[11] Patent Number: 5,912,525
[45] Date of Patent: Jun. 15, 1999

[54] VIBRATION ACTUATOR

[75] Inventors: Mina Kobayashi, Yokohama; Daisuke Saya, Urayasu, both of Japan

[73] Assignee: Nikon Corporation, Tokyo, Japan

[21] Appl. No.: 08/821,821

[22] Filed: Mar. 21, 1997

[30] Foreign Application Priority Data

| Mar. 21, 1996 | [JP] | Japan | 8-064568 |
| Apr. 2, 1996 | [JP] | Japan | 8-079893 |
| Mar. 19, 1997 | [JP] | Japan | 9-065707 |
| Mar. 19, 1997 | [JP] | Japan | 9-066840 |

[51] Int. Cl.$^6$ .................................................. H01L 41/08
[52] U.S. Cl. .................................... 310/323; 310/328
[58] Field of Search ............................................ 310/323

[56] References Cited

U.S. PATENT DOCUMENTS

| 4,812,697 | 3/1989 | Mishiro | 310/323 |
| 4,893,045 | 1/1990 | Honda | 310/323 |
| 4,965,482 | 10/1990 | Ohnishi et al. | 310/323 |
| 5,013,956 | 5/1991 | Kurozumi et al. | 310/323 |
| 5,039,899 | 8/1991 | Yamaguchi | 310/323 |
| 5,051,647 | 9/1991 | Uchikawa et al. | 310/323 |
| 5,059,849 | 10/1991 | Sumihara et al. | 310/323 |
| 5,101,132 | 3/1992 | Yamaguchi | 310/323 |
| 5,124,611 | 6/1992 | Tamai et al. | 310/323 |
| 5,136,200 | 8/1992 | Takizawa et al. | 310/323 |
| 5,140,215 | 8/1992 | Yamaguchi | 310/323 |
| 5,191,688 | 3/1993 | Takizawa et al. | 310/323 |
| 5,200,665 | 4/1993 | Iijima | 310/323 |
| 5,245,243 | 9/1993 | Ohnishi et al. | 310/323 |
| 5,416,375 | 5/1995 | Funakubo et al. | 310/323 |
| 5,448,129 | 9/1995 | Sumihara et al. | 310/323 |
| 5,557,157 | 9/1996 | Shirasaki | 310/323 |

FOREIGN PATENT DOCUMENTS

| A-0-696-072 | 7/1995 | European Pat. Off. . |
| A-0-674-350 | 9/1995 | European Pat. Off. . |
| A-8-103089 | 4/1996 | Japan . |
| A-8-140377 | 5/1996 | Japan . |
| A-8-242593 | 9/1996 | Japan . |

OTHER PUBLICATIONS

Ultrasonic Motors Theory and Applications, Oxford University Press Inc., New York, S. Ueha et al., pp. 131–135 and 192–196, 1993.

222"Piezoelectric Linear Motors for Application to Driving a Light Pick–Up Element", Yamagata University, Yoshiro Tomikawa et al., AEM Jun. 1993, pp. 393–398.

*Primary Examiner*—Mark O. Budd
*Attorney, Agent, or Firm*—Oliff & Berridge, PLC

[57] ABSTRACT

A vibration actuator is provided having a vibration element having an elastic member that generates driving force and a relative moving member pressed in contact with the driving force members. The sliding member is composed of a polyethernitrile matrix resin and is interposed in the contact areas of the elastic member and the relative moving member.

10 Claims, 14 Drawing Sheets

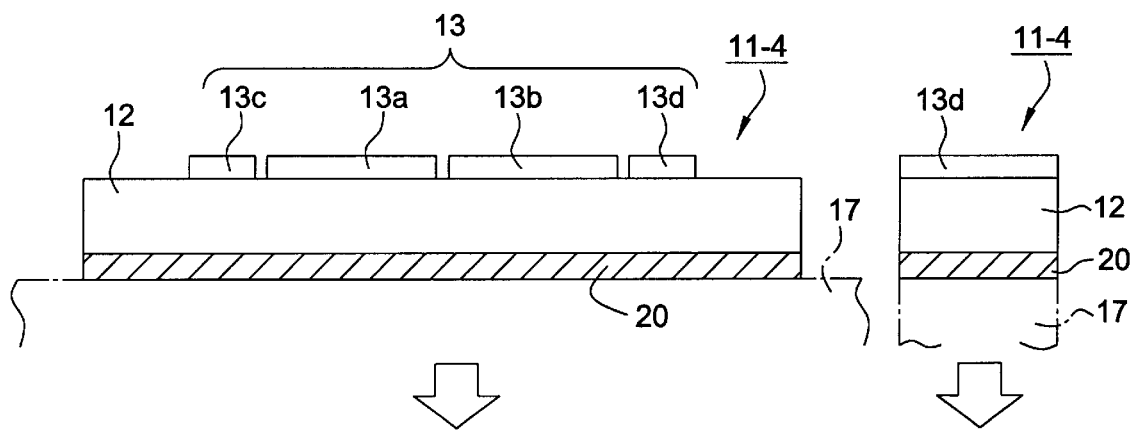
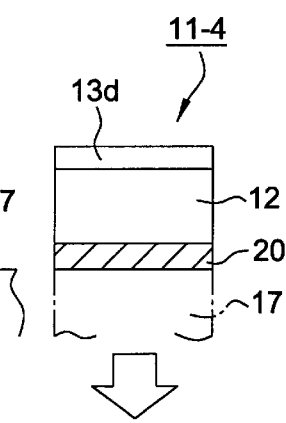
FIG. 6(A) BEFORE PROCESSING
FIG. 6(D)
FIG. 6(B) AFTER PROCESSING
FIG. 6(D')
FIG. 6(D")

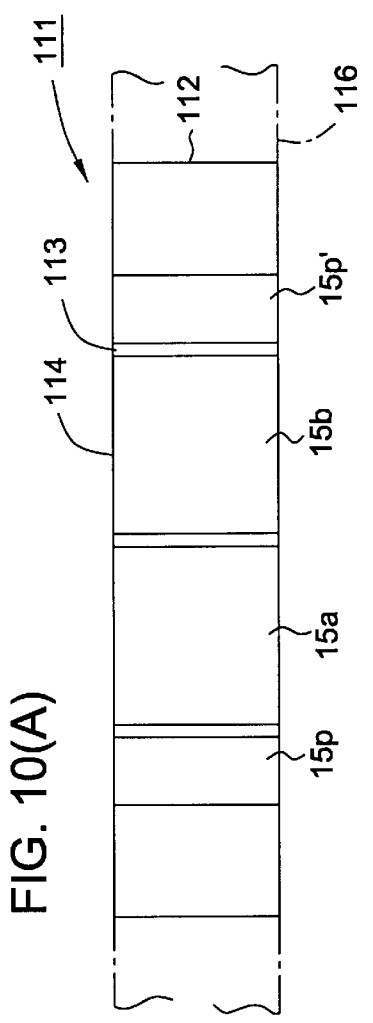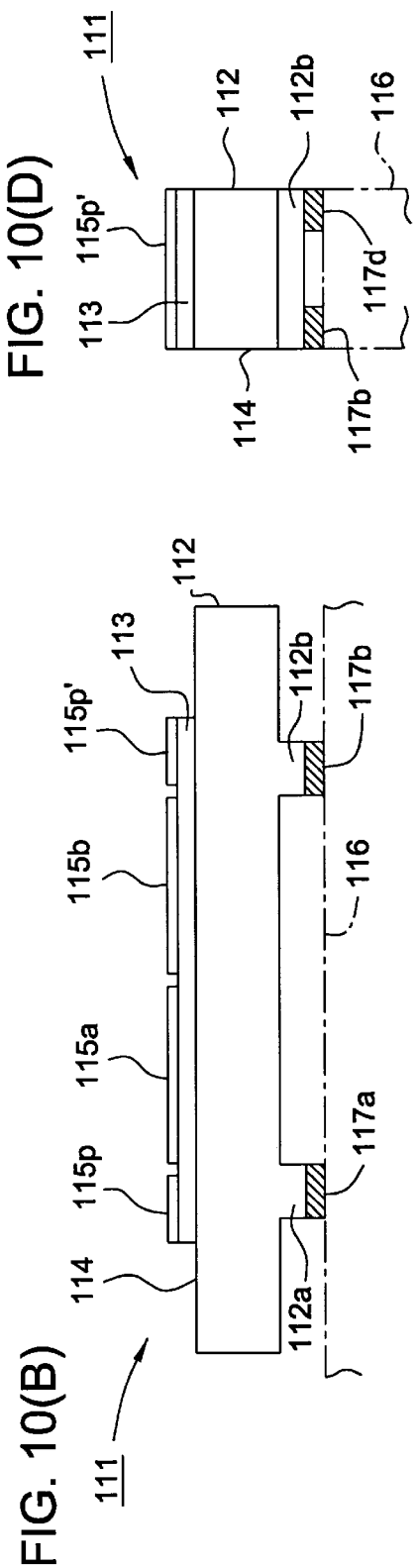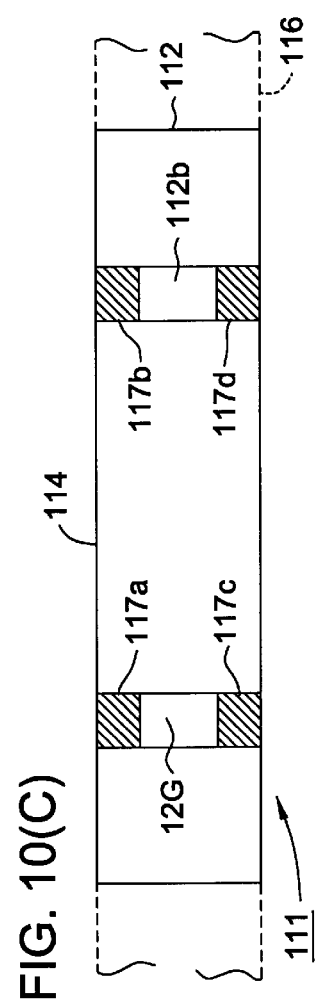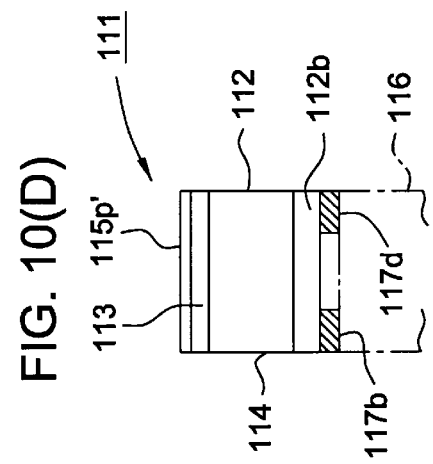

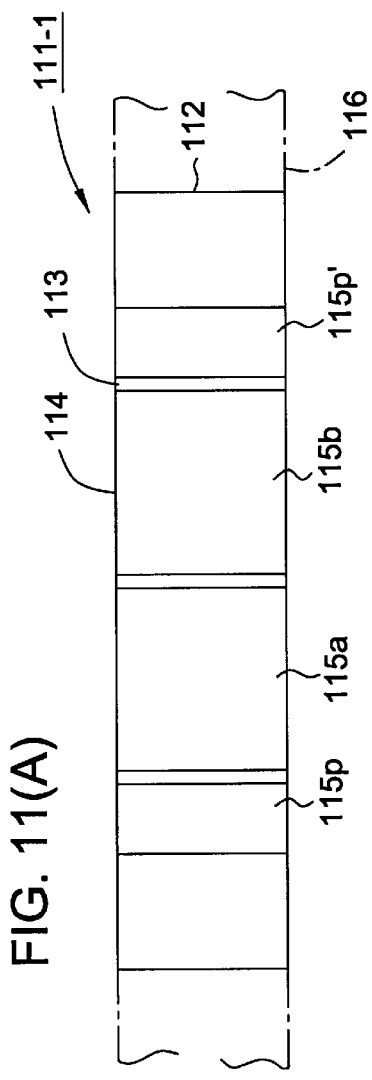
FIG. 11(A)
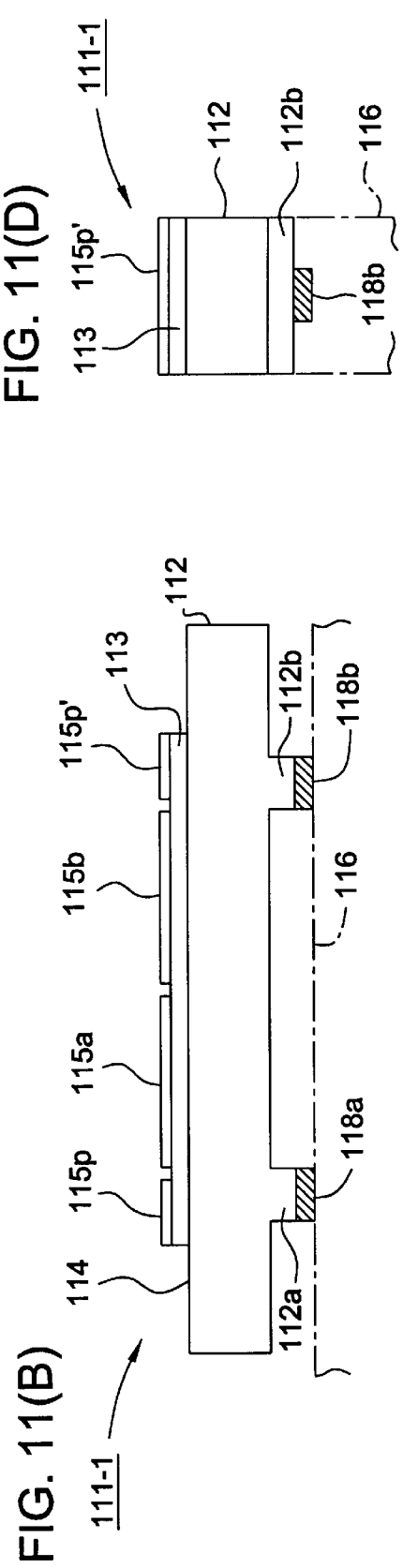
FIG. 11(B)
FIG. 11(C)
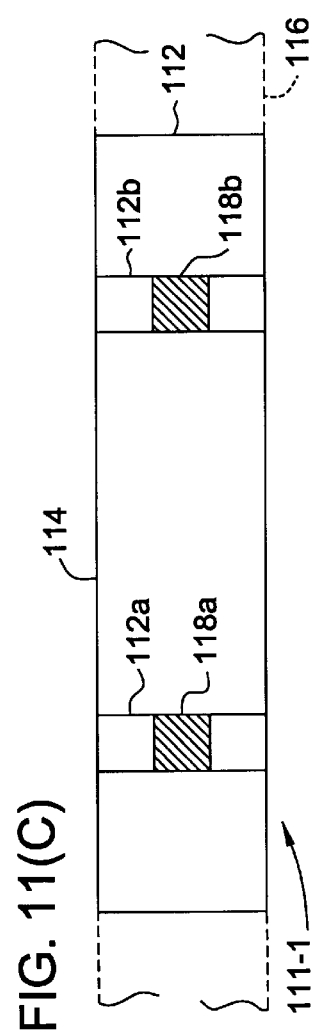
FIG. 11(D)

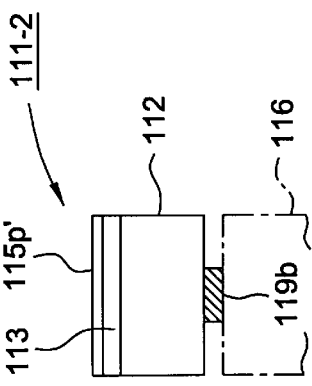
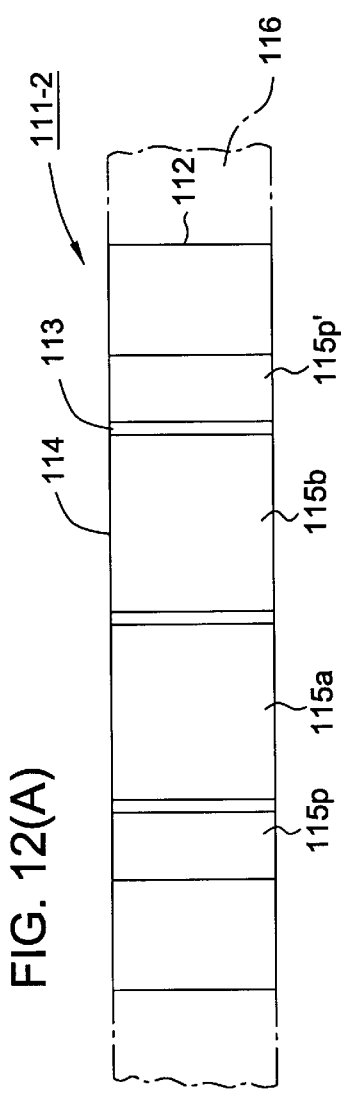
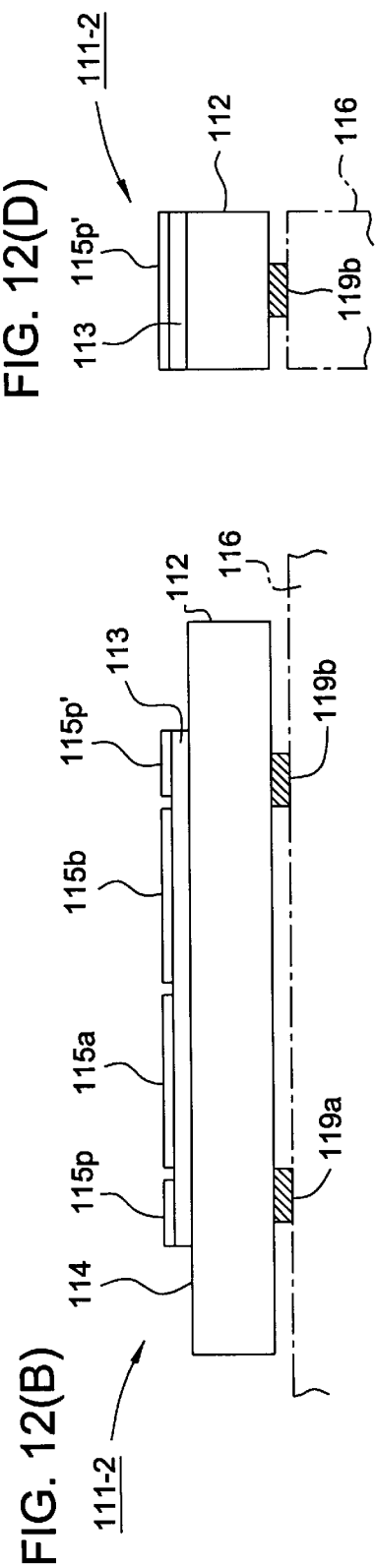
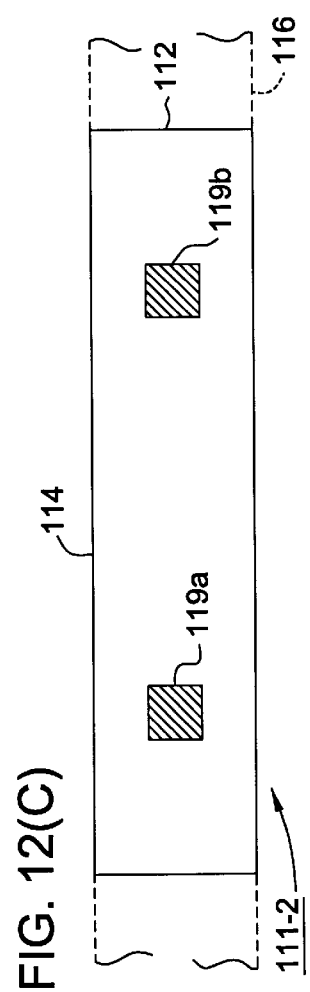
FIG. 12(A)
FIG. 12(B)
FIG. 12(C)
FIG. 12(D)

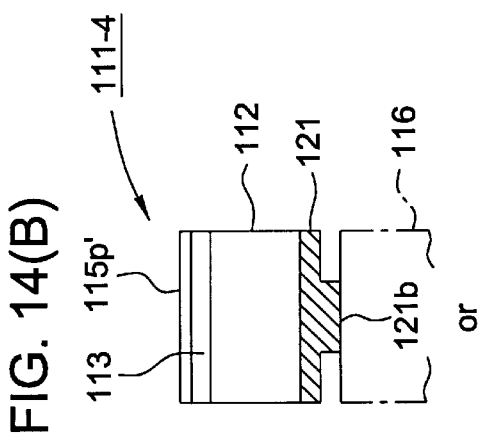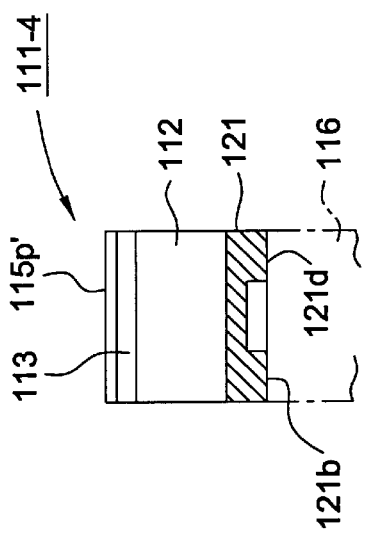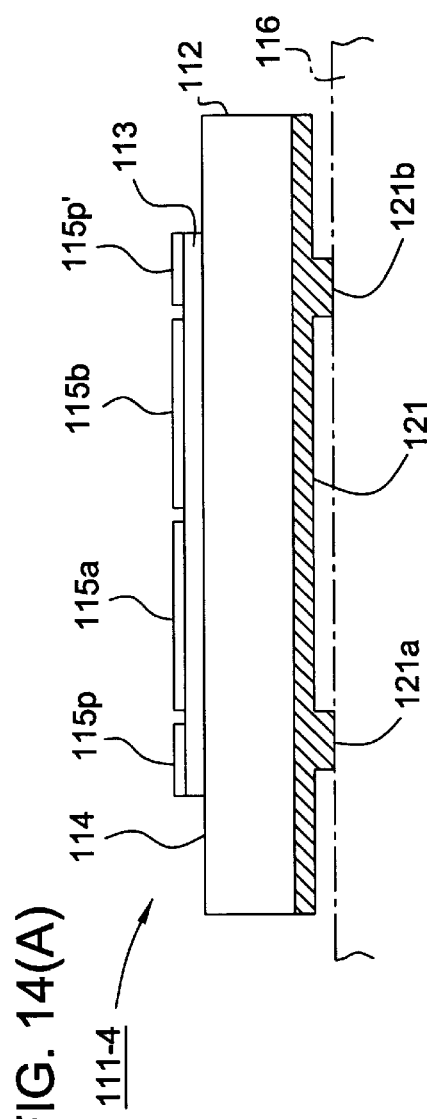

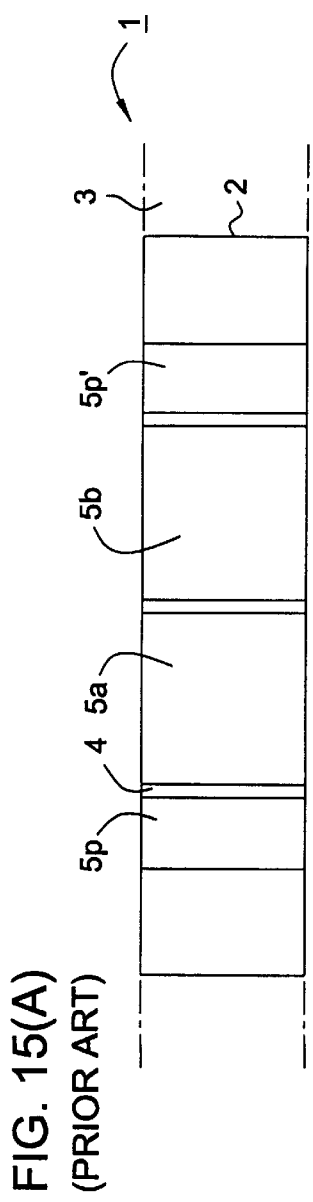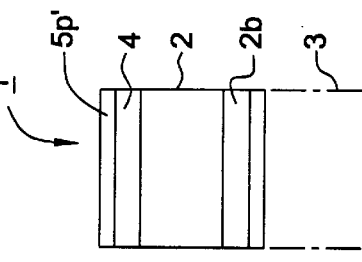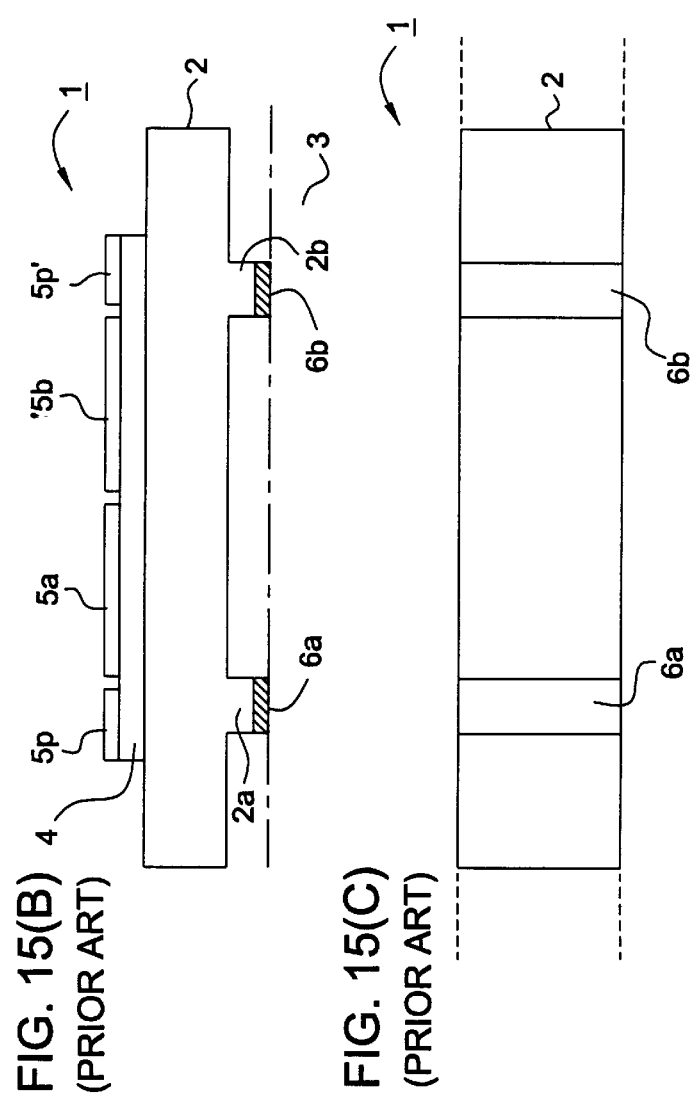
FIG. 15(A) (PRIOR ART)
FIG. 15(B) (PRIOR ART)
FIG. 15(C) (PRIOR ART)
FIG. 15(D) (PRIOR ART)

VIBRATION ACTUATOR

BACKGROUND OF THE INVENTION

1. Field of the Invention The present invention relates to a vibration actuator. More specifically, the present invention relates to a vibration actuator that generates relative motion between a relative moving member pressed in contact with a vibration element by exciting an elastic member by an electromechanical converting element and generating elliptic motion on the surface of the vibration element by harmonically generating a plurality of vibration modes.

2. Description of Related Art

Conventional vibration actuators generate longitudinal vibration and bending vibration on an elastic member as well as generate elliptic motion on the surface of an elastic member by joining an electromechanical converting element to the elastic member and applying an alternating-current voltage to this electromechanical converting element.

The structure and load properties of such a vibration actuator have been explained in "Piezoelectric linear motor for light pickup movement" (Yoshio TOMIKAWA, et al.: Proceedings of the Fifth Electromagnetic Power Dynamics Symposium), the subject matter of which is incorporated herein by reference.

FIG. 15 shows the configuration of such a vibration actuator 1. The vibration actuator 1 is rectangular and planar and has an elastic member 2 on one side on which driving force output members 2a and 2b are formed in protruding shapes. A relative moving member is pressed into contact with the elastic member 2 by the driving force output members 2a and 2b using an unillustrated pressing mechanism. Driving force output members 2a and 2b are formed in two locations to become the antinodes of a fourth-order bending vibration generated by elastic member 2 as will be described below.

A piezoelectric element 4 is formed on the other side of the elastic member 2 as a rectangular thin strip-shaped electromechanical converting element. Electrodes 5a, 5b, 5p and 5p' are formed on the surface of the piezoelectric element 4 in an electrically insulated state independent of each other.

An alternating-current voltage is applied to electrodes 5a and 5b with an electrical phase that differs by 90° for each of the electrodes 5a and 5b. Electrodes 5p and 5p' detect the state of the vibration generated by the elastic member 2. Lead wires (not shown) are soldered to the electrodes 5a, 5b, 5p, and 5p' and to a control circuit (not shown).

Drive signals applied as alternating-current voltage to electrodes 5a and 5b generate a first-order longitudinal vibration and a fourth-order bending vibration harmonically in elastic member 2. An elliptic motion is generated at the end of driving force output members 2a and 2b. Relative moving member 3 is thereby pressed into contact with elastic member 2 by a driving force output member which performs relative motion against the elastic member 2. This relative motion is used as a thrust output.

Such a vibration actuator 1 is designed so that the inherent vibration frequencies of the first-order longitudinal vibration and the fourth-order bending vibration become extremely near or equal to each other. Therefore, by applying alternating-current voltage of a frequency near the two inherent frequencies on electrodes 5a and 5b, the first-order longitudinal vibration and the fourth-order bending vibration can be generated harmonically.

Sliding members 6a and 6b are glued on the end faces of the driving force output members 2a and 2b for reducing the sliding resistance with relative moving member 3. These sliding members 6a and 6b are generally made of resinous materials and metallic materials.

This vibration actuator 1 has a characteristic of having no risk of inductive damage due to electromagnetic induction because it does not use a magnetic field. However, long-term driving in a vacuum is not possible because when the sliding members 6a and 6b are made of metal, the generation of abrasion powder by sliding with the relative moving member 3 becomes severe. On the other hand, gas is emitted when the sliding members 6a and 6b are made of resinous material.

Vibration actuator 1 substantially operates by the frictional driving between the affixed sliding members 6a and 6b and the relative moving member 3. Also, the achieved driving force depends on the product ($\mu \times W$) of the pressure W and the coefficient of friction $\mu$ between the elastic member 2 and the relative moving member 3.

The driving force ($\mu \times W$) can be raised by increasing the pressure W. However, if the pressure W is too great, the expanding and contracting generated in the elastic member 2 is suppressed and conversely the driving force decreases.

If the coefficient of friction $\mu$ of the sliding members 6a and 6b is made higher, the driving force ($\mu \times W$) can be raised. However, when the abrasion-resistance of sliding members 6a and 6b is great, the elastic member 2 causes defacement of the sliding surfaces of the elastic member 2 composed of material having a specified elasticity (for example, iron, stainless steel, aluminum alloys, etc.) and relative moving member 3. Thus, drive control as the initial stage of driving becomes extremely difficult. It could also be used only in an environment where the generation of abrasion powder does not become a problem.

Furthermore, there is a problem that the roughness occurring on the sliding surfaces of the elastic member 2 and the relative moving member 3 due to defacement of the sliding surfaces becomes a stimulus for wear of the sliding members 6a and 6b and it decreases the life of vibration actuator 1.

Further yet, the vibration actuator 1 does not tend to generate noise. However, noise is generated if metallic sliding members are used. Also, if resinous sliding members are used, the resin itself absorbs the vibration of the elastic member 2 depending on the type of resin and the driving force decreases. Furthermore, if resinous sliding members are used, the abrasion powder of the resin attaches to the other material in contact, the attached abrasion powder and the sliding members harden and become inseparable, and the driving of the vibration actuator stops. Also, noise is generated according to the roughness average of the contact areas of the vibration element and the relative moving member 2 contacted by a sliding member made of metallic material or resinous material.

SUMMARY OF THE INVENTION

The present invention may solve the above problems and provide a vibration actuator that is stable and has little wear.

The present inventors conducted research to solve the above problems and discovered that a vibration actuator that has extremely little wear, a long life and that can drive with stability by interposing a sliding member made of a polyethernitrile matrix resin between the vibration element and the relative moving member.

The vibration actuator may have extremely little wear, may drive with stability and may be obtained even when a sliding member is made of a fully aromatic polyimide matrix between the vibration element and the relative moving member.

A vibration actuator may be provided with a vibration element, a relative moving member that performs relative motion between itself and the vibration element and a sliding member composed of a polyethernitrile matrix resin interposed in the contact area of the vibration element and the relative moving member. Carbon fiber or polytetrafluoroethylene may also be included in the resin.

Furthermore, both carbon fiber and polytetrafluoroethylene may be included in said resin. In this case, preferable results can be obtained if the carbon fiber content is 15% to 40% by weight and the polytetrafluoroethylene content is 10% to 15% by weight.

The sliding member may be installed on either side of the contact area of the vibration element and the relative moving member.

The roughness average of the contact area of the relative moving member or the vibration element contacted by the sliding member may be less than the amplitude of the vibration generated by the vibration element. In this case, preferable results may be obtained by setting the roughness average to more than 0.1 $\mu$m and less than 1.0 $\mu$m.

Also, the vibration element may be formed in a rectangular parallelepiped shape and made as a configuration that generates both longitudinal vibration and bending vibration. The sliding member may be provided near the location of an antinode of the bending vibration in the vibration element.

Also, the vibration element may be formed in a cylindrical shape and made as a configuration that generates both a tortional vibration and a longitudinal vibration. The sliding member may be installed on either side of the contact area of the vibration element and the relative moving member.

A vibration actuator may also be constructed with a vibration element, a relative moving member that performs relative motion between itself and the vibration element and a sliding member composed of a fully aromatic polyimide matrix interposed in the contact area of the vibration element and the relative moving member. Graphite or polytetrafluoroethylene may be included in the resin.

Furthermore, both carbon fiber and polytetrafluoroethylene may be included in the resin. Preferable results may be obtained if the graphite content is 10% to 40% by weight and the polytetrafluoroethylene is 10% to 20% by weight.

Also, the sliding member may be installed on either side of the contact area of the vibration element and the relative moving member, respectively.

The roughness average of the contact area of the relative moving member or the vibration element contacted by the sliding member is less than the amplitude of the vibration generated by the vibration element. In this case, preferable results can be obtained by setting the roughness average to a value between 0.1 $\mu$m and 1.0 $\mu$m.

Also, the vibration element may be formed in a rectangular parallelepiped shape and made as a configuration that generates both longitudinal vibration and bending vibration. The sliding member may be provided near the location of an antinode of the bending vibration in the vibration element.

The vibration element may be formed in a cylindrical shape and made as a configuration that generates both a tortional vibration and a longitudinal vibration. The sliding member may be installed on either side of the contact area of the vibration element and the relative moving member, respectively.

A vibration actuator may be provided that has extremely little wear, a long life and that can drive with stability by interposing a sliding member made of a polyethernitrile matrix resin between the vibration element and the relative moving member. This prevents stoppage due to the abrasion powder and generation of noise. Use within a vacuum may also become possible.

Even further, a vibration actuator may be provided that has extremely little wear, that has a long life and that can drive with stability by interposing a sliding member made of a fully aromatic polyimide matrix between the vibration element and the relative moving member. Use within a vacuum may also become possible. Furthermore, operation of the initial driving may also be stable.

Other objects, advantages and salient features of the invention will become apparent from the detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein:

FIGS. 5(A)–5(D) show a vibration actuator according to the present invention from a plane view, a front view, a bottom view and a side view;

FIGS. 6(A)–6(D") show a vibration actuator according to the present invention from a front view and a side view before processing, and a front view and side views after processing;

FIGS. 10(a)–10(d) show a vibration actuator according to the present invention from a plane view, a front view, a bottom view and a side view;

FIGS. 11(a)–11(d) show a vibration actuator according to the present invention from a plane view, a front view, a bottom view and a side view;

FIGS. 12(a)–12(d) show a vibration actuator according to the present invention from a plane view, a front view, a bottom view and a side view;

FIGS. 14(a)–14(b') show a vibration actuator according to the present invention from a front view and a side view; and FIGS. 15(a)–15(d) show a conventional vibration actuator from a plane view, a front view, a bottom view and a right side view.

DETAILED DESCRIPTION OF PREFERRED EMBODIMENTS

Embodiments of the present invention are explained in detail below referring to the attached drawings. The explanation is given taking ultrasonic actuators using ultrasonic vibration ranges as examples of vibration actuators.

First Embodiment

Figure 1A:
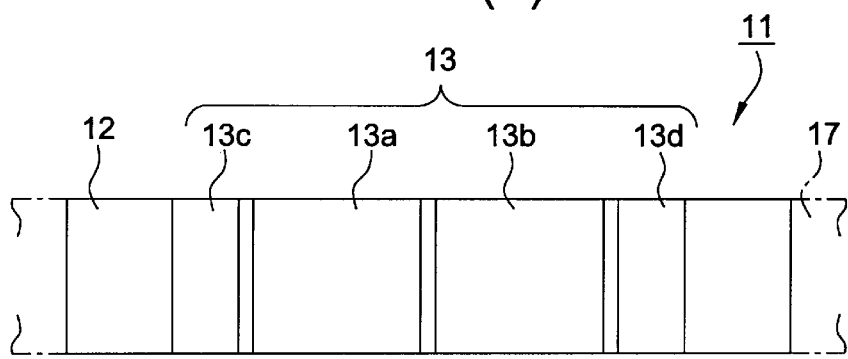
FIGS. 1(A)–1(C) show an ultrasonic actuator according to the present invention from a plane view, a front/side view and a bottom view.
Figure 1B:
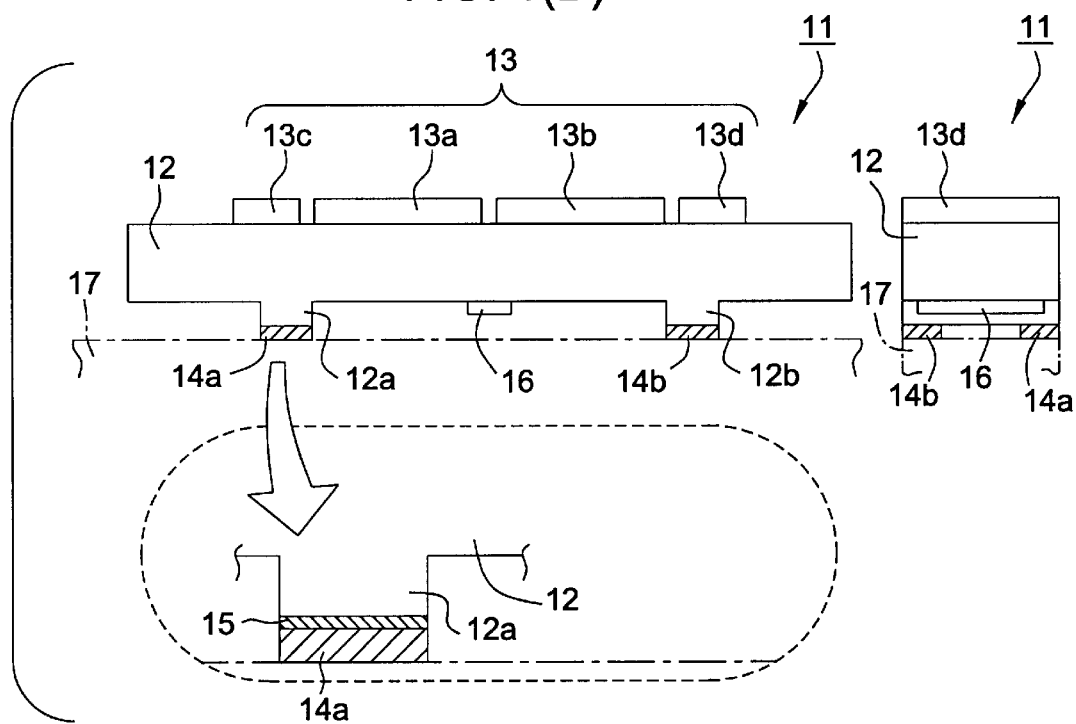
Figure 1C:
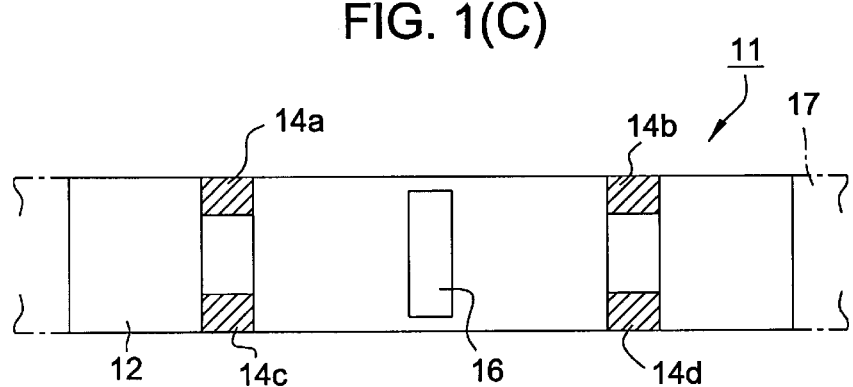

FIG. 1 is explanatory drawings showing an ultrasonic vibration actuator 11 according to the present invention. FIG. 1(A) is a plane view, FIG. 1(B) is a front view and a side view and FIG. 1(C) is a bottom view.

The ultrasonic actuator includes a rectangular planar elastic member 12 and a relative moving member 17 pressed in contact with the elastic member 12.

The elastic member 12 may be made of stainless steel or a metallic material such as an aluminum alloy and a resinous material (i.e., plastic).

Piezoelectric elements 13 are located on one face of the elastic member 12. Piezoelectric elements 13 are electro-mechanical conversion elements that convert electrical energy into mechanical displacement. The present embodiment includes four piezoelectric elements 13a, 13b, 13c, and 13d.

Two piezoelectric elements 13a and 13b are installed along the lengthwise direction of the elastic member 12 as driving piezoelectric elements for generating the driving force causing the vibrations. An alternating-current voltage is applied to piezoelectric elements 13a and 13b having the electrical phase that differs by 90° for each.

Vibration detecting piezoelectric elements 13c and 13d are also installed along the lengthwise direction of the elastic member 12 for detecting the vibration state generated by the elastic member 12. The vibration detecting piezoelectric elements 13c and 13d are connected to a control circuit (FIG. 2) as will be explained below.

Rectangular parallelepiped-shaped driving force output members 12a and 12b are formed on the other face of the elastic member 12 across the entire length of the elastic member 12. These driving force output members 12a and 12b become the two antinodes of a fourth-order bending vibration generated by elastic member 12.

Rectangular, planar sliding members 14a, 14c, 14b and 14d, are located on the two ends of the driving force output members 12a and 12b along the lengthwise direction of the end surfaces. These sliding members are preferably adhered by an epoxy-type adhesive 15.

Sliding members 14a, 14c, 14b and 14d may be made of polytetrafluoroethylene and carbon fiber mixed into a polyethernitrile matrix resin such as ID300 TM750 manufactured by Idemitsu Materials Co. Ltd.

Polyethernitrile is a crystalline thermoplastic resin having high strength, superior heat-resistance, abrasion-resistance and having good shaping processability. In the present embodiment, it has extremely desirable properties as a material for the sliding members 14a–14d.

The elastic member 12 is pressed by a suitable pressure W toward relative moving member 17 by an unillustrated pressing device. Metallic foil 16 is bonded on the backside of elastic member 12 having an unillustrated soldered lead wire, which is connected to an electric ground potential.

Figure 2:
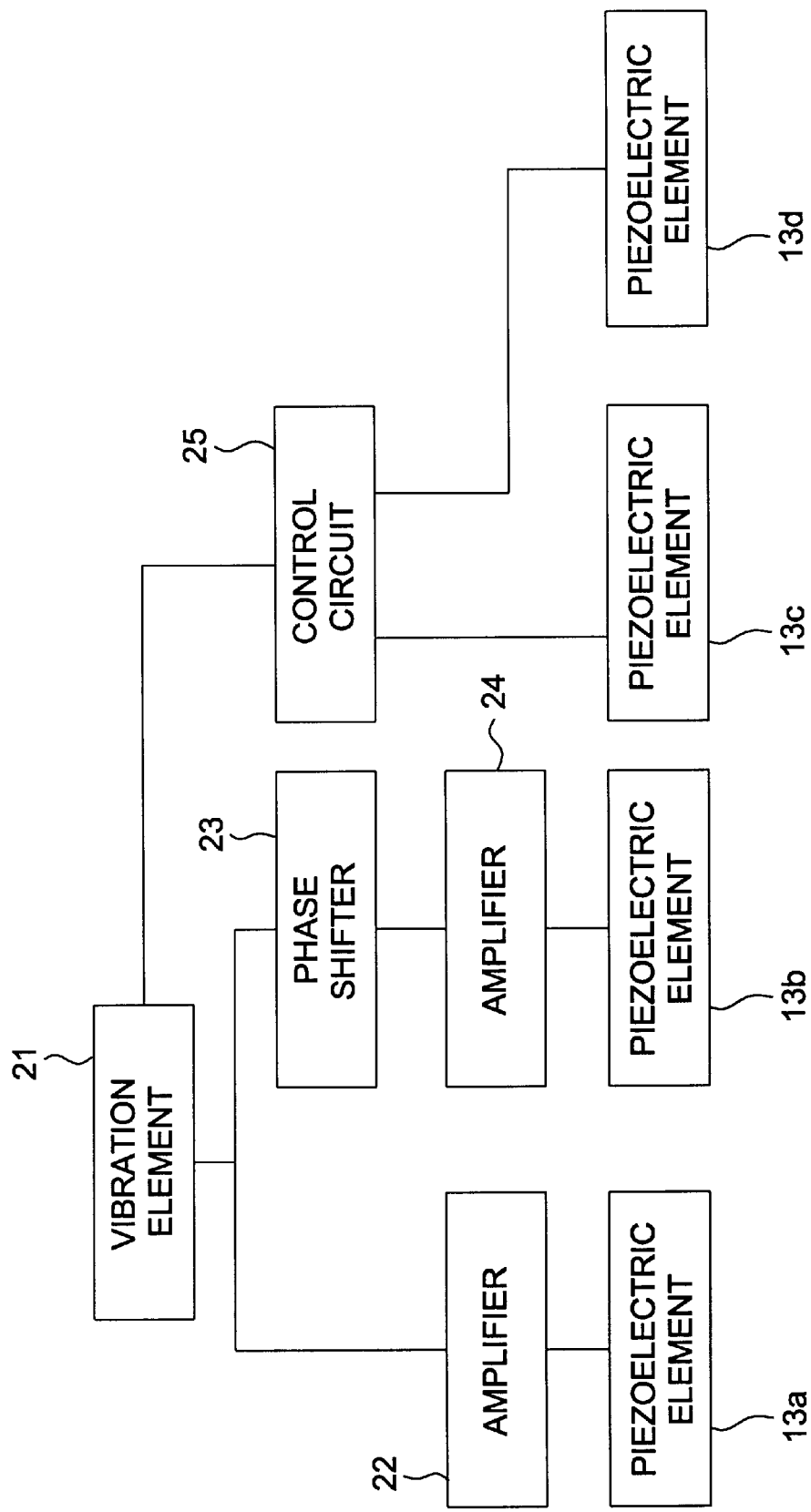
FIG. 2 shows a drive circuit of the ultrasonic actuator.

FIG. 2 which shows a drive circuit of the ultrasonic actuator 11 of the present embodiment. In FIG. 2, the drive signals output from a vibrator 21 are divided into two. One side is input into the piezoelectric element 13a through the amplifier 22. The other side is input into the piezoelectric element 13b through the amplifier 24 after its phase has been $\pi/2 = 90°$ converted by the phase shifter 23.

The piezoelectric elements 13c and 13d output electrical signals to the control circuit 25 that were obtained from the detected vibrations. Control circuit 25 receives these signals and outputs corrected signals to the vibrator 21. Vibrator 21 outputs the proper signals by performing correction of the drive signals. Thus, the drive signals from the vibrator 21 are adapted.

By such a drive circuit, an elliptic motion is generated on the ends of the protrusions 12a and 12b of the elastic member 12 by applying the voltage having the phase electrically differ by 90° for the piezoelectric elements 13a and 13b. Due to the generated elliptic motion, a relative motion occurs between the elastic member 12 and the relative moving member 17.

The following enumerated effects can be achieved because the sliding members 14a–14d are composed of a material having mixed polytetrafluoroethylene and carbon fiber with the polyethernitrile matrix resin.

(1) The generation of abrasion powder is little, and there is no emission of gas.

(2) There is no defacement of the sliding faces of the driving force output members 12a and 12b and of relative moving member 17, and there is no defacement of the sliding member itself. Therefore, drive control during initial driving becomes easy and the generation of abrasion powder is extremely suppressed.

(3) Surface irregularities caused on the sliding faces by defacement of the sliding faces of the elastic member 12 and the relative moving member 17 is reduced so that the lifetime of the vibration actuator 11 is extended.

(4) The amount of wear of the sliding members 14a–14d is reduced and the amount of absorption of the vibration of the elastic member 12 by the sliding members 14a–14d is suppressed so that the driving force does not decrease. Furthermore, because the abrasion powder of the sliding members 14a–14d does not attach to the other members, abnormal stoppage of the vibration activator can be prevented.

When polytetrafluoroethylene and carbon fiber are included in the polyethernitrile matrix resin, their compositions desirably are: 10% to 15% by weight of polytetrafluoroethylene and 15% to 40% by weight of carbon fiber. If lower than these ranges, the sliding property may become insufficient. On the other hand, if over these ranges, the polyethernitrile matrix resin may become thin. Also, if the amount of polytetrafluoroethylene is over the range, there is the risk that it would transfer to the contact surface of the complementary members and that driving would stop because of the contact surfaces of the complementary members hardening and becoming inseparable.

Second Embodiment

Figure 3A:
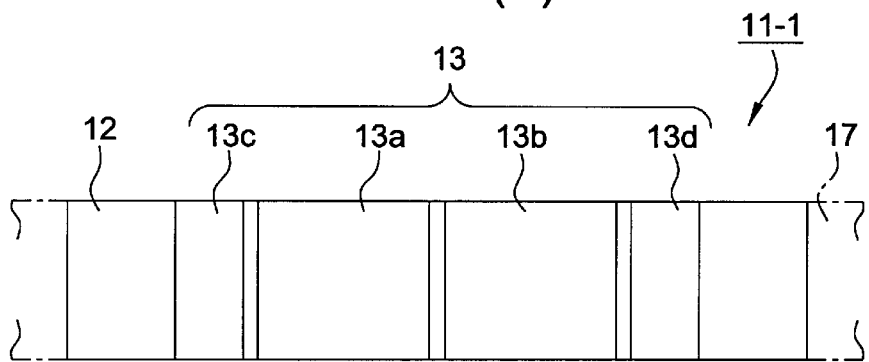
FIGS. 3(A)–3(D) show a vibration actuator according to the present invention from a plane view, a front view, a bottom view and a side view.
Figure 3B:
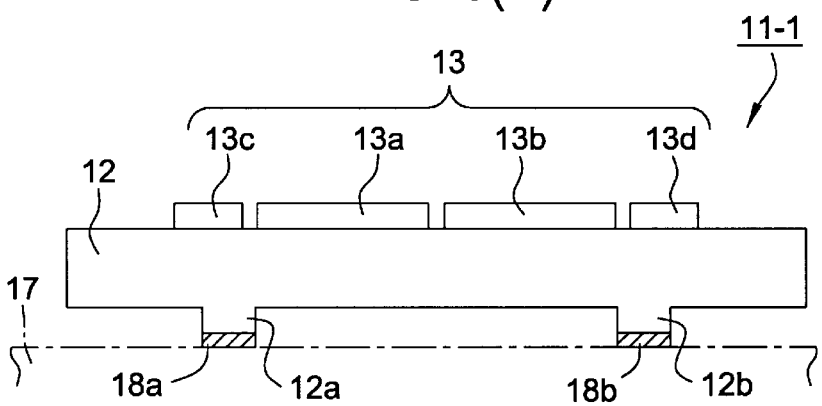
Figure 3D:
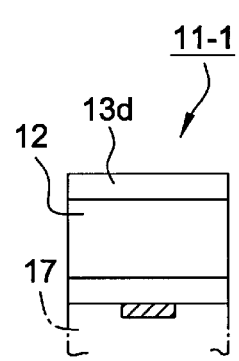
Figure 3C:
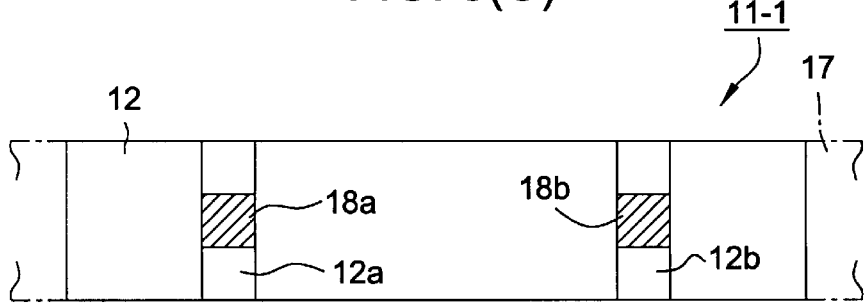
Figure 4A:
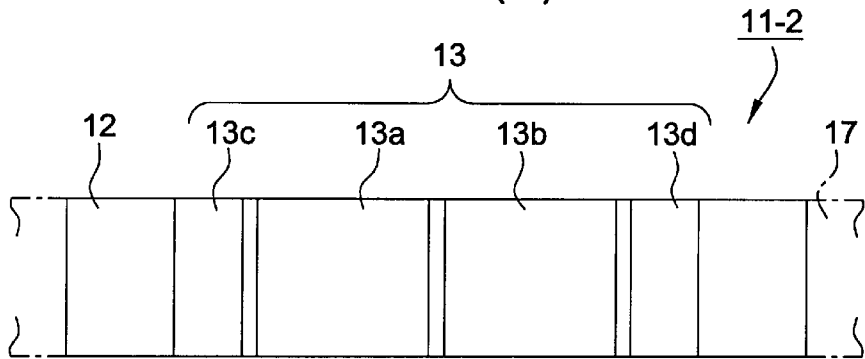
FIGS. 4(A)–4(D) show a vibration actuator according to the present invention from a plane view, a front view, a bottom view and a side view.
Figure 4B:
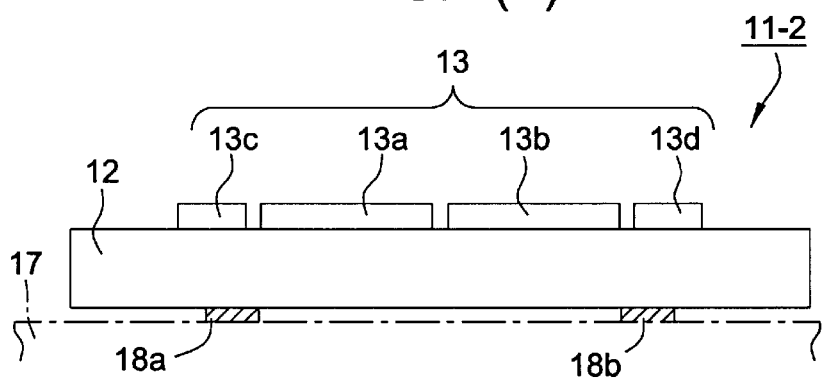
Figure 4D:
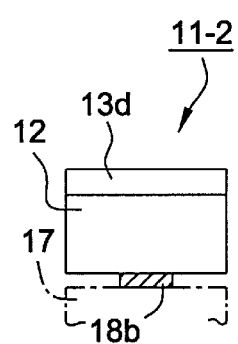
Figure 4C:
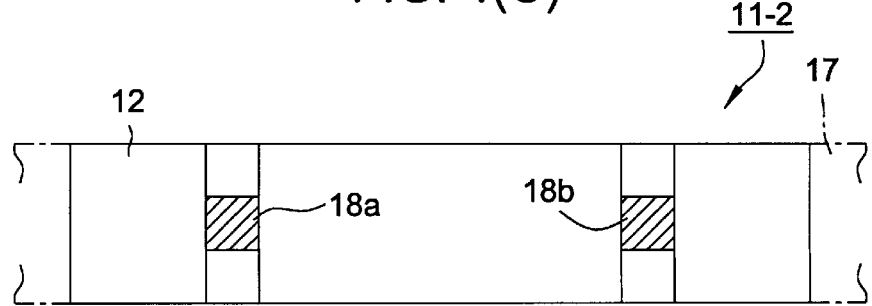
Figure 5A:
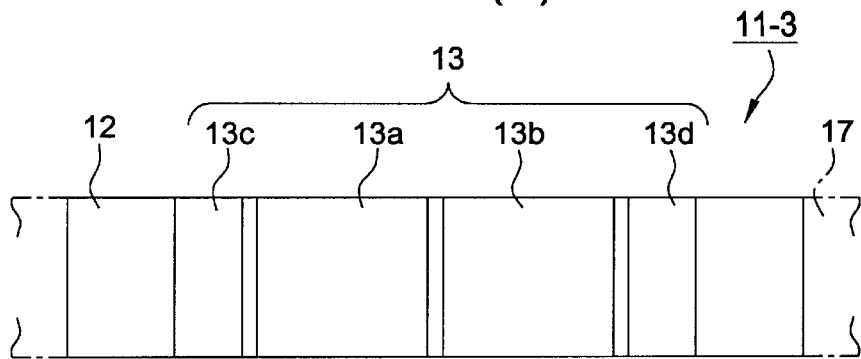
Figure 5B:
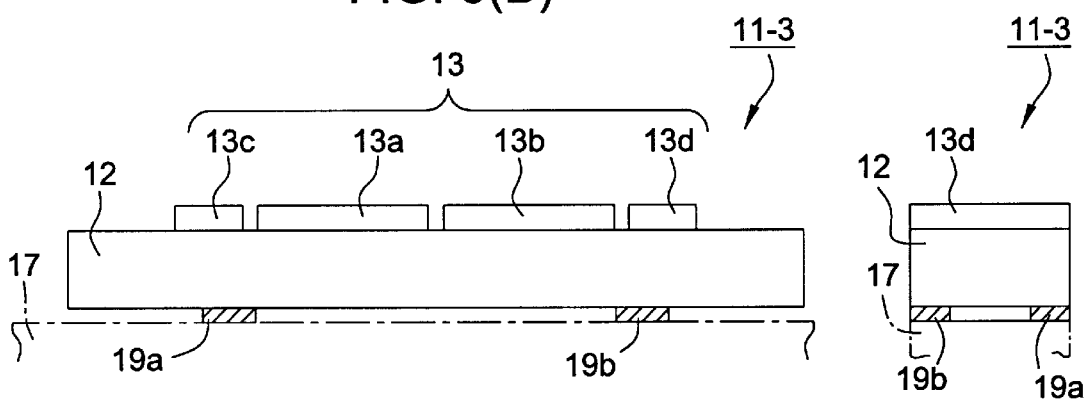
Figure 5C:
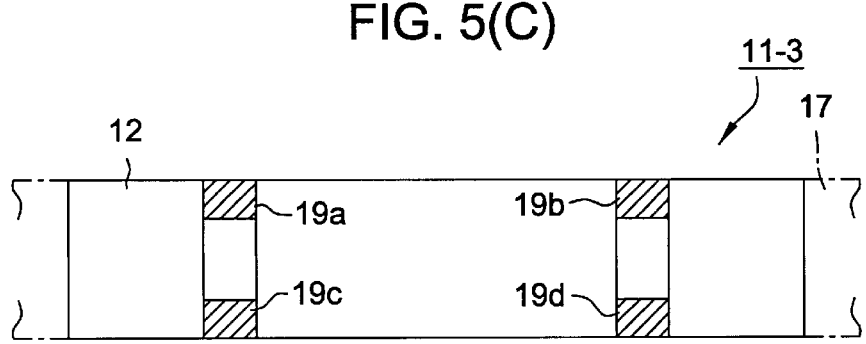

An ultrasonic actuator of another embodiment will now be explained with reference to FIGS. 3–6. The following explanation is only given for the components that differ from that described above. FIG. 3(A), FIG. 4(A) and FIG. 5(A) are plane view drawings, FIG. 3(B), FIG. 4(B), FIG. 5(B), FIG. 6(A) and FIG. 6(B) are front view drawings, FIG. 3(C), FIG. 4(C), and FIG. 5(C) are bottom view drawings, and FIG. 3(D), FIG. 4(D), FIG. 5(D), FIG. 6(D)' and FIG. 6(D)" are side view drawings.

In the ultrasonic actuator 11 described above, rectangular planar sliding members 14a–14d are installed on the two ends along the lengthwise direction of the ends of the driving force output members 12a and 12b. The FIG. 3 embodiment changes the manner of installation of these sliding members.

In the ultrasonic actuator 11-1 shown in FIG. 3, rectangular planar sliding members 18a and 18b are attached to the centers of the ends of the driving force output members 12a and 12b. Compared with FIG. 1, the surface pressure of the sliding members 18a and 18b is raised and the driving force is improved.

In the ultrasonic actuator 11-2 shown in FIG. 4, the driving force output members 12a and 12b are planar without forming protruding shapes. Rectangular planar sliding members 18a and 18b are attached directly to the centers along the lateral direction of the elastic member 12. Compared with the FIG. 1 ultrasonic actuator 11, the increase of processed items can be suppressed because the driving force output members 12a and 12b are not protruding shaped.

In the ultrasonic actuator 11-3 shown in FIG. 5, the driving force output members 12a and 12b are planar without protruding. Rectangular planar sliding members 19a, 19b, 19c and 19d are directly attached to the two ends along the lateral direction of elastic member 12. Compared with the FIG. 1 ultrasonic actuator 11, the increase of processed items can be suppressed because the driving force output members 12a and 12b are not protruding. In addition, elastic member 12 and relative moving member 17 can be contacted with stability.

FIG. 6 show modified examples of this embodiment. FIG. 6(A) is a front view and FIG. 6(D) is a side view showing the state before processing. FIG. 6(B) is a front view and FIG. 6(D)' and FIG. 6(D)" are side views showing the state after processing. The ultrasonic actuator 11-4 shown in FIG. 6(B) has a planar sliding member 20 attached to the backside (the side not having piezoelectric members) of the elastic member 12. Driving force output members 20a and 20b are formed integrally with the sliding member 20. According to this modified example, the insufficiency of precision of the surface of the elastic member 12 can be compensated by attaching the sliding member 20. The driving force output members 20a–20d can be attached in one location in the center along the lateral direction of the elastic member 12 as shown in FIG. 6(D)' or in two locations on both ends as shown in FIG. 6(D)".

These modified examples can be selected according to performance such as torque and initial thrust, the furnishing environment, the shape of the relative moving member and its furnishing space sought for the ultrasonic actuator.

Third Embodiment

Figure 7:
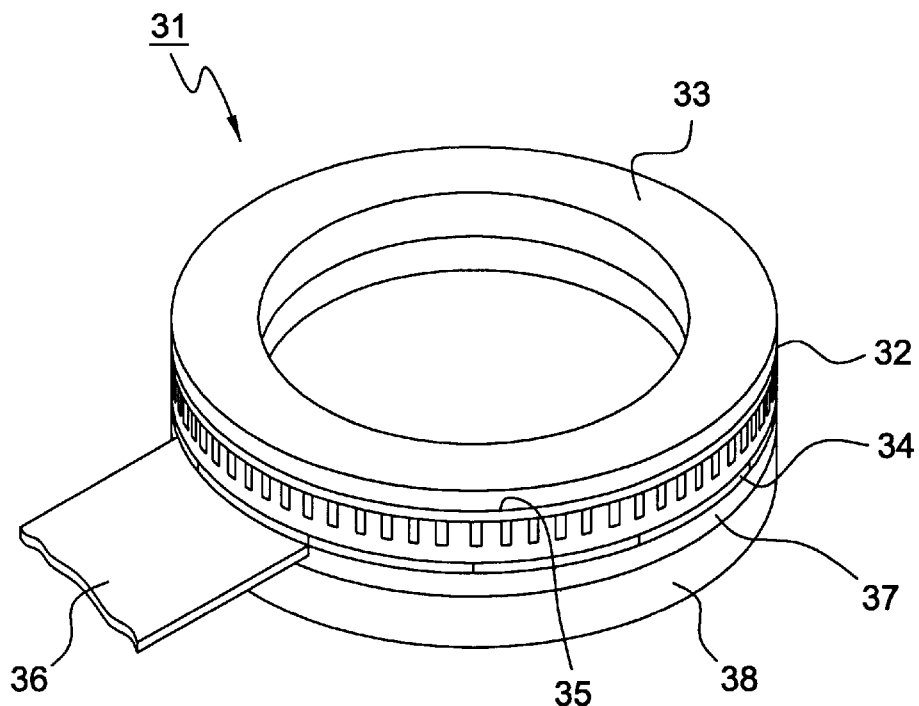
FIG. 7 shows the configuration of an ultrasonic actuator according to the present invention.
Figure 8:
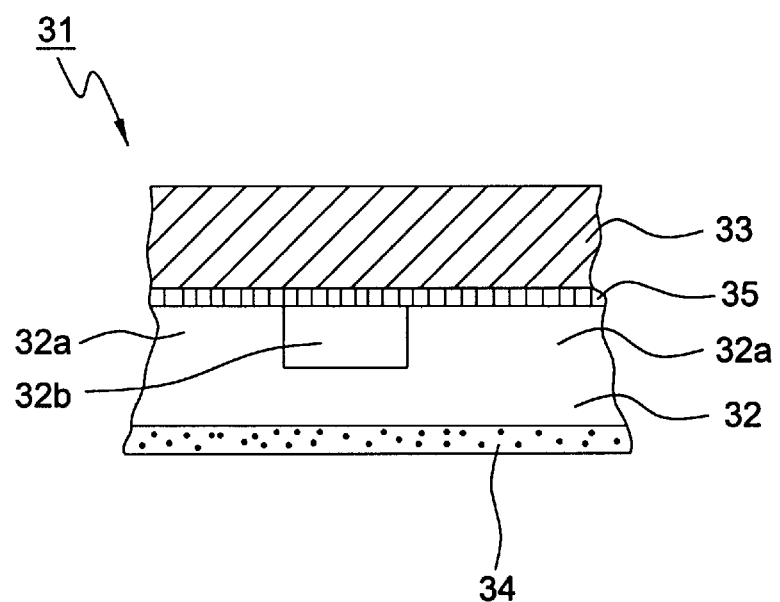
FIG. 8 shows a side view of the ultrasonic actuator.

FIG. 7 show an ultrasonic actuator 31 of another embodiment. FIG. 8 is an expanded side drawing.

The ultrasonic actuator 31 is a traveling wave type ultrasonic actuator having a ring-type vibration element. The ultrasonic actuator 31 includes an annular vibration element 32 furnished with a plurality of protrusions 32a on the end surface around the perimeter and an annular relative moving member 33 pressed in contact with the vibration element 32 by the end surfaces of the protrusions 32a shaped like teeth of a comb.

The vibration element 32 is formed in a ring shape by an elastic material such as metal. A plurality of rectangular grooves 32b are provided on one plane of this vibration element. A plurality of vertically rectangular protrusions 32a are formed by being partitioned by these grooves 32b. These protrusions 32a have a function for devising the improvement of the drive efficiency by increasing the amplitude of the elliptic motion generated in the end surfaces of the protrusions 32a. By dropping the abrasion powder generated by contact with the relative moving member 33 into the grooves 32b, the abrasion powder is made so as not to be present on the contact surfaces.

Piezoelectric elements 34 (i.e., electromechanical conversion elements) are formed on the surface opposite the surface on which the protrusions 32a are formed. The piezoelectric elements 34 are divided into a plurality at, for example, a 20° pitch in the perimeter direction of the vibration element 32. Also, the mutually adjacent piezoelectric elements are poled in the opposite directions (permanent polarization). When a sine wave voltage A is applied through a flexible substrate 36 to the group of the piezoelectric elements 34a poled in one direction and a sine wave voltage B with a phase that differs by 90° from sine wave A is applied through the flexible substrate 36 to the group of piezoelectric elements 34b poled in the other direction, a traveling wave propagating unidirectionally is generated on the surface of the vibration element 32 having the protrusion 32a.

An annular sliding member 35 is composed of a polyethernitrile matrix resin and is attached to the contact surface of the relative moving member 33 with the elastic member 32.

That is, the traveling wave generated by the vibration element 32 by applying a drive voltage to the piezoelectric element group 34a and the piezoelectric element group 34b is propagated through the sliding member 35 to the relative moving member 33. This generates a relative motion between the vibration element 32 and the relative moving member 33.

The elastic member 32 has a surface on which the piezoelectric element 34 is fixed/supported by an annular bearing member 38. An annular vibration absorbing material 37 is placed between piezoelectric element 34 and bearing member 38.

By utilizing the ultrasonic actuator 31, identical effects can be achieved as with the embodiment shown in FIG. 1 because sliding member 35 is composed of a polyethernitrile matrix resin.

Fourth Embodiment

Figure 9:
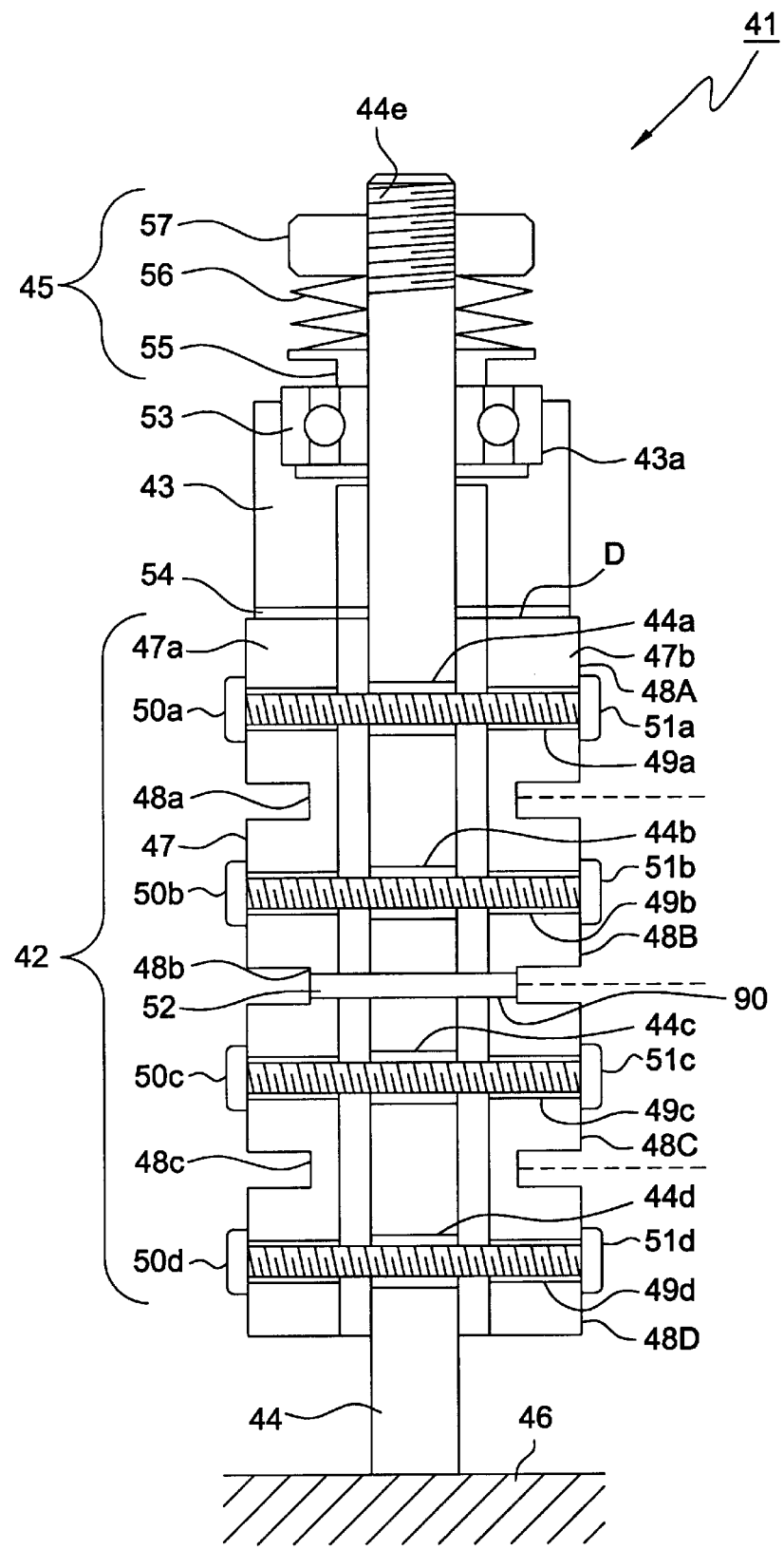
FIG. 9 shows an ultrasonic actuator according to the present invention.
Figure 13D:
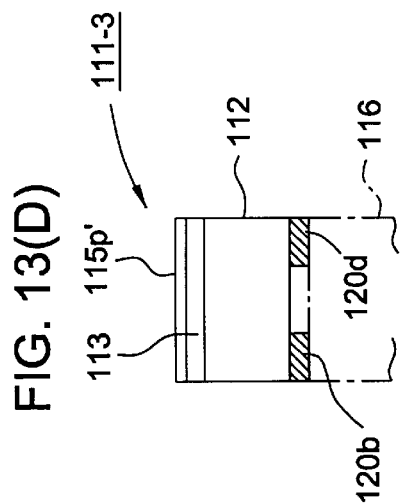
FIGS. 13(a)–13(d) show a vibration actuator according to the present invention from a plane view, a front view, a bottom view and a side view.
Figure 13A:
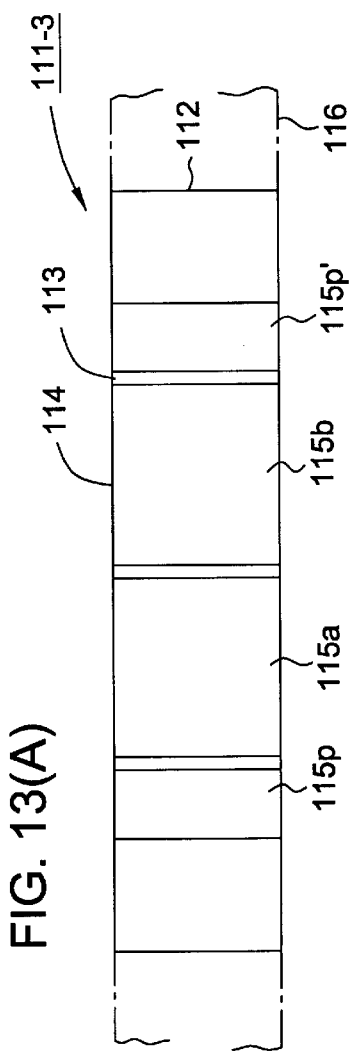
Figure 13B:
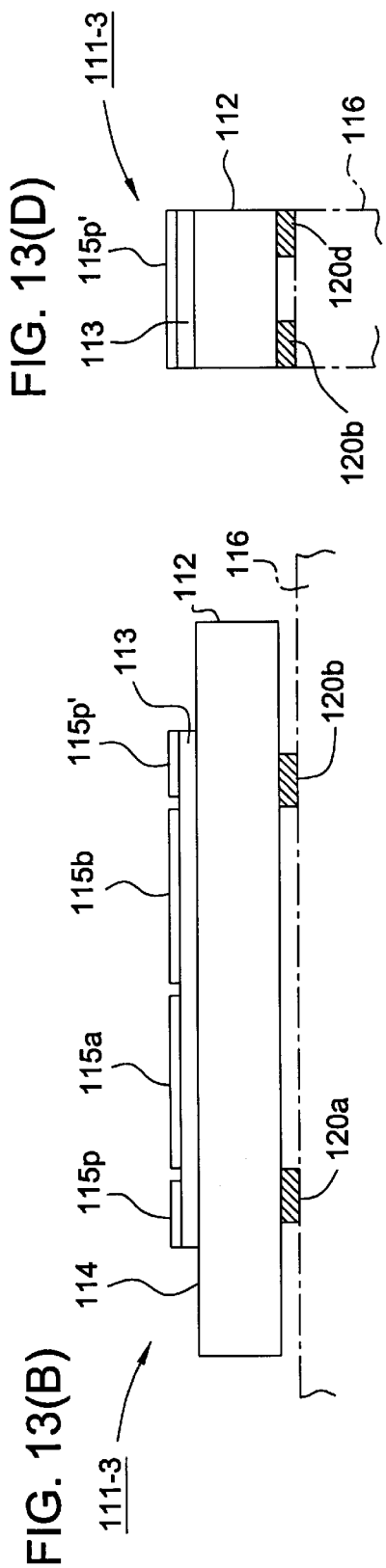
Figure 13C:
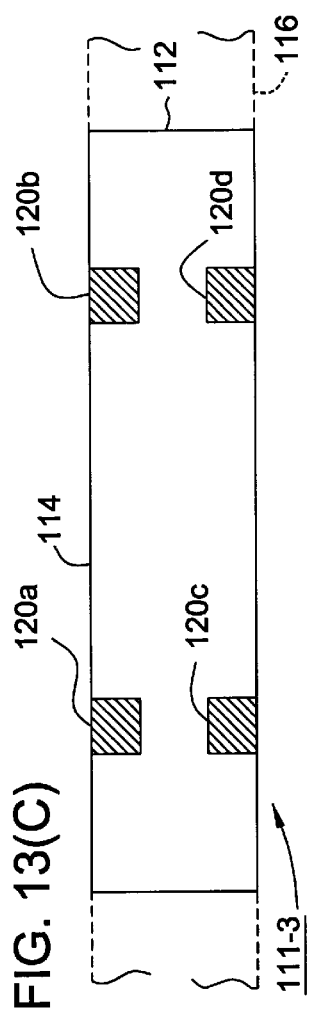

FIG. 9 show an ultrasonic actuator 41 of another embodiment that has a vibration element 42 that generates a tortional vibration and a longitudinal vibration.

The ultrasonic actuator 41 includes a cylindrical vibration element 42. A cylindrical moving element 43 is the relative moving element in contact with the vibration element 42. Furthermore, a fixing shaft 44 supports the moving element 43 so as to be freely rotated. A pressing mechanism 45 presses the moving element 43 toward the vibration element 42.

The fixing shaft 44 is a rod-shaped shaft having one end fixed to a fixing plate 46. Bolt holes 44a–44d are formed in the middle section of the fixing shaft 44 perpendicular to the central axis of the fixing shaft 44 to be bolted by binding bolts 50a–50d. A screw section 44e is formed on the other end of the fixing shaft 44.

The vibration element 42 has a hollow section for receiving the fixing shaft 44. The vibration element 42 is composed of a flexible member 47 of semi-cylindrical members 47a and 47b obtained by vertically dividing a cylindrical member 47 made of flexible material and then reassembled into a cylindrical shape. The piezoelectric elements (not illustrated) are the electromechanical conversion elements sandwiched by the divided surfaces of the semi-cylindrical members 47a and 47b.

Small-diameter sections 48a, 48b and 48c are formed on the sides of the elastic member 47 due to grooves being formed in the annular shape. Large-diameter sections 48A, 48B, 48C, and 48D are formed due to these small-diameter sections 48a–48c being separated. Small-diameter sections 48a–48c are formed in order to make the resonant frequencies of the longitudinal vibration and the tortional vibration generated by the elastic member 47 match or substantially match. Furthermore, bolt holes 49a–49b are formed approximately in the middle sections of the large-diameter sections 48A–48D in the direction of the central axis of the elastic member.

Assembly of vibration element 42 may be performed as follows. First, semi-cylindrical members 47a and 47b are assembled in a state having received fixing shaft 44 into the hollow section. The piezoelectric elements are installed in the two contact surfaces of the semi-cylindrical members 47a and 47b in a placement explained below. After this, the binding bolts 50a–50d are bolted through bolt holes 49a–49b and bolt holes 44a–44d and nuts 51a–51d are twisted securely.

Bolt hole 90 is provided in the small-diameter section 48b of the elastic member 47 and in fixing shaft 44 for bolting by a bearing pin 52. Elastic member 47 is fixed/retained on fixing shaft 44 by bolting bearing pin 52 into these bolt holes 90.

The piezoelectric elements are installed on the two divided faces of the semi-cylindrical members 47a and 47b. The piezoelectric elements are distinguished largely into two types such as a tortional vibration-generating piezoelectric element for generating the tortional vibration in relation to the axial direction and a longitudinal vibration-generating piezoelectric element for generating the longitudinal vibration expanding and contracting toward the axial direction.

The tortional vibration-generating piezoelectric elements are placed in two locations (i.e., the node positions of the generated tortional vibration) on both ends along the axial direction of the elastic member. The longitudinal vibration-generating piezoelectric elements are in one central location (i.e., the node position of the generated longitudinal vibration) along the axial direction of the elastic member. The tortional vibration-generating piezoelectric elements are piezoelectric elements that generate shear potential in relation to the axial direction of the elastic member and are placed such that they modulate in mutually opposite directions at the two divided surfaces. The longitudinal vibration-generating piezoelectric elements are piezoelectric elements that generate a modulation in relation to the axial direction of the elastic member and are placed such that they modulate in mutually similar directions.

When a sine wave voltage A is applied to the tortional vibration-generating piezoelectric elements and a sine wave voltage B, having a phase that differs by 90° from sine wave voltage A, is applied to the longitudinal vibration-generating piezoelectric element, the two vibrations are generated simultaneously and an elliptic motion is generated in the driving surface D of the vibration element.

The moving member 43 (i.e., the relative moving member) is a cylindrical member. Also, an annular groove 43a is formed in the inner perimeter of one end and ball bearings 53 are inserted and fixed in this annular groove 43a.

An annular sliding member 54 is installed by adhesion on the other end of the moving member 43. This sliding member 54 is composed by a polyethernitrile matrix resin identical to the above-described embodiments.

The moving member 43 is installed by ball bearings 53 onto the fixing axis 44 and is supported to be freely rotated against the fixing shaft 44. Thus, the sliding member 54 adhered to the other surface of the moving member 43 contacts the driving surface D of the vibration element 42.

A pressing mechanism 45 is furnished on the surface opposite vibration element 42 at ball bearings 53 to press the moving member 43 toward the vibration element 42. This pressing mechanism 45 is constructed by a cylindrically formed pressure propagating member 55 installed on the fixing shaft 44 and has an outward oriented flange, a pressing screw 56 installed on the end of the pressure propagating member 55 and a pressing nut 57 twisted securely on the screw section 44e of the fixing shaft 44. The ball bearings 53 are pressed toward the side of elastic member 47, which results in the moving member 43 being pressed in contact with elastic member 47.

When a sine wave voltage A is applied to the tortional vibration-generating piezoelectric elements and a sine wave voltage B having a phase that differs by 90° from sine wave voltage A is applied to the longitudinal vibration-generating piezoelectric element, the two vibrations are generated simultaneously. An elliptic motion is generated in the driving surface D of the vibration element because of the synthesis of these vibrations. Moving member 43 is thereby pressed into contact with driving surface D of the vibrator and is driven in a one-way rotation.

Sliding member 54 is composed of a polyethernitrile matrix resin installed on the surface of the moving member 43 in contact with the vibrator 42. Therefore, the same effects can be achieved as in the above embodiments.

The above embodiments generally relate to a linear drive-type ultrasonic actuator, annular-type ultrasonic actuator and rotating drive-type ultrasonic actuator. However, the vibration actuator of the present invention is not limited to such modes. The vibration actuator can be applied equivalently to vibration actuators having other modes whereby sliding is performed between the vibration element and the moving member.

The present invention can also be applied to vibration actuators of types driving the relative moving member by the vibration of a tortional vibration element.

In each of the embodiments, ultrasonic actuators utilizing ultrasonic vibration frequencies were taken as examples. However, the vibration actuator based on the present invention is not limited to such a mode. It can also be applied to vibration actuators having other vibration regions.

In each embodiment, piezoelectric elements were used as the electromechanical conversion elements. However, the vibration actuator is not limited to such a mode. It is acceptable as long as electrical energy is converted into mechanical potential.

In two of the above embodiments, the sliding member was bonded to the vibration element, and in the other two embodiments, the sliding member was bonded to the relative moving member. However, either manner is acceptable. The sliding member may be interposed between the vibration element and the relative moving member in either manner according to the configuration.

Fifth Embodiment

Sliding members 14a–14d of FIG. 1 may be fabricated from polyethernitrile, such as ID300 TM750 from Idemitsu Materials Co., Ltd., containing 30% by weight of carbon fiber and 10% by weight of polytetrafluoroethylene.

These sliding members 14a–14d may be adhered by an epoxy type adhesive to the driving force output members 12a and 12b of an elastic member having stainless steel, such as SUS304.

When a vibration is generated in the elastic member 12 and the drive surface 17 (i.e., the relative moving member) is driven by applying drive voltage to the piezoelectric elements 13a and 13b of an ultrasonic actuator 11 fabricated in this manner, the effects enumerated below have been achieved. The roughness average in the contact surface of the relative moving member 17 may set to a value lower than 0.1 μm. Also, the amplitude of the vibration generated in the elastic member 12 may be 2 μm. Thus, the roughness average of the contact surface of the relative moving member 17 contacted by the sliding members 14a–14d is less than the amplitude of the vibration.

EFFECTS OF THE PRESENT EMBODIMENTS (1) The amount of wear caused by friction of the contact surfaces of the elastic member 12 and the relative moving member 17 when driven is extremely little and stable performance can be demonstrated over a long period.

(2) The torque and initial thrust generated by the elastic member 12 and the relative moving member 17 being pressed into contact are great.

(3) No generation of noise when driven.

(4) The drive properties are stable.

(5) No abnormal stoppage by abrasion powder adhering to other members when driven.

The ultrasonic actuator 11 satisfies all the properties required for an ultrasonic actuator and can contribute sufficiently to practical use.

Sixth Embodiment

The elastic members 12 of FIG. 1 may be fabricated by a stainless steel material such as SUS304. Sliding members 14a–14d may be adhered by epoxy type adhesive on the end faces of the driving force output members 12a and 12b of these elastic members 12. The sliding members 14a–14d may be fabricated into the specified shape with the materials (1)–(5) enumerated below.

EXAMPLE OF THE PRESENT INVENTION (1) Polyethernitrile, such as ID300 TM750 from Idemitsu Materials Co., Ltd., containing 15% by weight of graphite. ID300 TM750 brand polyethernitrile is preferably used. However, the same active effects can be achieved using ID300 CF15 and ID300 CF30 brand polyethernitrile.

COMPARATIVE EXAMPLES (2) 100% by weight of pure polyethernitrile.

(3) 100% by weight of polyetheretherketone such as VICTREX-450G from Sumitomo Chemical Co., Ltd.

(4) 80% by weight of polyphenylene ether such as XYRON X5402 from Asahi Chemical Industry Co., Ltd.

(5) 100% by weight of polyethersulfone such as SUMI-KAEXCEL 4100G from Sumitomo Chemical Co., Ltd.

By applying a drive voltage to the piezoelectric elements 12 of the above embodiments of ultrasonic actuators, vibrations are generated in the elastic members 12 and driven onto the relative moving members 17. The coefficients of kinetic friction immediately following the initial driving, after ten hours have elapsed, the loss of mass, and motor efficiency after driving are have been measured as shown below.

EXPERIMENTAL CONDITIONS

Opposing Material: SUS304
Surface Pressure (Pressure): 30 gf/mm$^2$
Experimental Time: 100 hours The effects are compiled in Table 1 through Table 3.

TABLE 1

| | Coefficient of Kinetic Friction | |
|---|---|---|
| Material | Immediately After Initial Driving | 10 Hours After Driving |
| 1 | 0.11 | 0.11 |
| 2 | 0.12 | 0.13 |
| 3 | 0.12 | 0.55 |
| 4 | 0.24 | 0.57 |
| 5 | 0.11 | 0.49 |

TABLE 2

| Material | Mass After Driving/Mass Before Driving × 100% |
|---|---|
| 1 | 99.93% |
| 2 | 99.90% |
| 3 | 98.10% |
| 4 | 98.59% |
| 5 | 98.34% |

TABLE 3

| Material | Efficiency |
|---|---|
| 1 | 45 |
| 2 | 41 |
| 3 | 21 |
| 4 | 11 |
| 5 | 10 |

From Table 1 it is clear that material (1) has a smaller rate of increase of the coefficient of kinetic friction and demonstrates an extremely stable performance compared to the Comparative Examples (2)–(5).

From Table 2 it is clear that material (1) has less loss of mass and less emission of gas in a vacuum compared to the Comparative Examples (2)–(5).

Furthermore, from Table 3 it is clear that material (1) has a higher motor efficiency after ten hours have passed and demonstrates superior performance compared to the Comparative Examples (2)–(5).

The experiments have been performed concerning the compositional ranges of 15% to 40% by weight of graphite and 10% to 15% by weight of polytetrafluoroethylene to obtain experimental results approximately equal to the test samples of (1) in Tables 1 through 3.

Also, the present invention has a low depth of wear after ten hours have passed and has an extremely superior abrasion resistance.

Seventh Embodiment

Elastic members 12 in FIG. 1 may be fabricated with stainless steel material such as SUS304. The sliding members 14a–14d may be fabricated on the end faces of the driving force output members 12a and 12b by epoxy type adhesive into the specified shape with polyethernitrile, such as ID300 TM750 from Idemitsu Materials Co., Ltd. and containing 10% by weight of polytetrafluoroethylene and 30% by weight of carbon fiber.

The roughness averages Ra of the contact surfaces of the relative moving members 17 contacted by elastic members 12 vary at the levels of 0.005, 0.01, 0.1, 0.5, and 1.0.

The continuous time from the initial driving to stoppage due to abrasion powder was measured concerning the samples at these five levels. The measurement results are compiled in Table 4.

TABLE 4

| Ra | Continuous Time From Initial Driving To Stoppage Due To Abrasion Powder |
|---|---|
| 0.005 | 23h |
| 0.01 | 31h |
| 0.1 | 100h or higher |
| 0.5 | 100h or higher |
| 1.0 | 42h |

The attachment of the sliding materials to the elastic members of SUS304 was examined by infrared microspectrophotometry. At that time, the contact points of each driving surface with the frictional material were selected at random for each ten points. The results are compiled in Table 5.

TABLE 5

| Ra | Ratio At Which The Peak Of The Resinous Constituent Was Detected |
|---|---|
| 0.005 | 10/10 |
| 0.01 | 2/10 |
| 0.1 | 0/10 |
| 0.5 | 0/10 |
| 1.0 | 6/10 |

As shown in FIG. 5, the ratio at which the peak of the resinous constituent was detected is 0 at a roughness average Ra of 0.1–0.5. From this it is clear that, combined with the results of the first embodiment, the roughness average Ra of the opposing material on the contact surface being contacted by the sliding members is desirably a value of 0.1 µm or higher and less than 1.0 µm.

Eighth Embodiment

FIG. 10 is explanatory drawings showing an eighth embodiment of a vibration actuator based on the present invention. FIG. 10(a) is a plane view, FIG. 10(b) is a front view, FIG. 10(c) is a bottom view and FIG. 10(d) is a side view. The ultrasonic actuator of this embodiment is rectangular and planar and includes an elastic member 112 having driving force output members 112a and 112b formed as protrusions on the surface of one side and a piezoelectric element 113 (i.e., the electromechanical conversion element) adhered to the surface of the other side of elastic member 112. The vibration actuator 114 is formed by elastic member 112 and piezoelectric element 113.

Elastic member 112 is formed in a rectangular planar shape of a metallic material such as stainless steel and aluminum alloy, a plastic material, or the like.

The driving force output members 112a and 112b (i.e., the drive-generating members) are formed in protruding shapes along the lateral direction of the elastic member 112 in the positions to become the antinodes of a bending vibration (i.e., the surface of one side of elastic member 112). The driving force output members 112a and 112b are formed in protruding shapes, but may also be formed in other shapes, but in planar shapes so as to become uniform with the surface of one side of elastic member 112.

Rectangular piezoelectric elements composed of PZT, (i.e., the electromechanical conversion elements) may be attached on the other side surface of elastic member 112.

Separate and independent electrodes 115a, 115b, 115p and 115p' are installed on one surface of the piezoelectric elements 113. Electrodes 115a and 115b are the electrodes for inputting the drive signals.

Electrodes 115p and 115p' are electrodes for detecting the vibration state generated in the elastic member 112. After the drive state is determined, they are not used. These electrodes 115a, 115b, 115p and 115p' have unillustrated soldered lead wires such that each lead wire is connected to the same unillustrated control circuit.

A first-order longitudinal vibration and a fourth-order bending vibration are generated harmonically in the elastic member 112 by applying alternating-current voltage as the drive signals whereby the electrical phase mutually differs by 90°. An elliptic motion is generated in the ends of driving force output members 112a and 112b. Relative moving member 116, pressed into contact with the elastic member 112 by the driving force output members 112a and 112b, performs relative motion against the elastic member 112 by the generated elliptic motion. This relative motion is used as a thrust output.

This vibration actuator 111 is designed so that the inherent vibration frequencies of the first-order longitudinal vibration and the fourth-order bending vibration become extremely equal to each other. Therefore, by applying an alternating-current voltage of a frequency near the two inherent frequencies on the electrodes 115a and 115b, respectively, the first-order longitudinal vibration and the fourth-order bending vibration can be generated harmonically.

Elastic member 112 has a center along its lengthwise direction pressed by a suitable pressure toward the side of the relative moving member 116 by an unillustrated pressing mechanism.

Rectangular, thin strip-shaped sliding members 117a, 117b, 117c, and 117d are formed in protruding shapes and affixed by epoxy type adhesive on both sides along the lengthwise direction of the ends of driving force output members 112a and 112b in order to reduce the sliding resistance with the relative moving member 116.

Sliding members 117a–117d are composed by a fully aromatic polyimide matrix resin.

Therefore, the sliding members 117a–117d are provided with the appropriate degree of strength and abrasion resistance to withstand driving in a vacuum and thereby prevent damage caused on the frictional surfaces. Also, an ultrasonic actuator 111 can be provided having little generation of abrasion powder, having a long life and demonstrating stable properties.

The sliding members 117a–117d may contain both graphite and polytetrafluoroethylene. Therefore, the below described effects can be demonstrated.

(1) By adding graphite, the initial abrasion can be reduced.

(2) By adding polytetrafluoroethylene, the abrasion resistance can be improved and abrasion can be reduced.

(3) By adding graphite and polytetrafluoroethylene, the rate of water absorption can be reduced so alteration of the material quality of the sliding members is constrained to a minimum and driving is stable.

(4) By adding graphite and polytetrafluoroethylene, the surface hardness can be reduced to the appropriate degree. Therefore, the tracking capability of the sliding members to the affixed vibration elements or relative moving members is improved and propagation and abrasion resistance of the driving force are improved.

These effects are particularly prominent when the graphite content is in the range of 10% to 40% by weight, and the polytetrafluoroethylene content is in the range of 10% to 20% by weight.

Thus, because the sliding members are composed of a fully aromatic polyimide matrix resin in addition to graphite and polytetrafluoroethylene, the ultrasonic actuator can be driven in a vacuum, have a great driving force, have little amount of wear and have a long life. In particular, because it uses a fully aromatic polyimide, it is extremely stable chemically and can be driven with extreme stability even for a long period of time.

Ninth Embodiment

FIGS. 11–14 are explanatory drawings showing a further embodiment of a vibration actuator based on the present invention. FIG. 11(a), FIG. 12(a), and FIG. 13(a) are plane views. FIG. 11(b), FIG. 12(b), FIG. 13(b) and FIG. 14(a) are front views. FIG. 11(c), FIG. 12(c) and FIG. 13(c) are bottom views. FIG. 11(d), FIG. 12(d), FIG. 13(d), FIG. 14(b) and FIG. 14(b)' are side views.

In the previously described ultrasonic actuator 111, rectangular, thin strip-shaped sliding members 117a–117d were formed in protruding shapes and installed on both sides along the lengthwise direction of the ends of the driving force output members 112a and 112b. However, FIGS. 11–14 are examples having modified the mode of installing these sliding members.

In the ultrasonic actuator 111-1 (FIG. 11), the sliding members 118a and 118b are affixed in the center between the end surfaces of the driving force output members 112a and 112b.

In the ultrasonic actuator 111-2 (FIG. 12), the driving force output members 112a and 112b are formed in planar shapes and sliding members 119a and 119b are affixed directly in the center along the lateral direction of elastic member 112.

In the ultrasonic actuator 111-3 (FIG. 13), the driving force output members 112a and 112b are formed in planar shapes and sliding members 120a, 120b, 120c and 120d are affixed directly to both ends along the lateral direction of the elastic member 112.

In the ultrasonic actuator 111-4 (FIG. 14), the driving force output members 121a and 121b are formed integrally on the sliding member 21. The driving force output members 121a–121d may be placed in the center along the lateral direction of elastic member 112 shown in FIG. 14(b) and may be placed in two places on both ends as shown in FIG. 14(b)'.

These examples can be selected according to the performance such as torque, furnishing environment, shape of the relative moving member and furnishing space sought for the ultrasonic actuator.

The invention is not limited to linear drive type ultrasonic actuators. Rather, it may be applied to vibration actuators of other forms such as the rotating type ultrasonic actuators as in two of the above embodiments.

Also, ultrasonic actuators using ultrasonic vibration have been used as examples. However, vibration actuators of other vibration regions can also be applied.

Also, piezoelectric elements have been described as the electromechanical conversion elements. However, it is acceptable as long as electrical energy is converted into mechanical potential such as electrical strain can be indicated as an example.

Vibration actuators that drive the relative moving member by vibration of a tortional vibration element can also be used in a similar manner.

The sliding members may be interposed between the vibration element and the relative moving member by bonding the sliding members to the vibration element. However, the sliding members may also be bonded to the relative moving member.

Tenth Embodiment

The sliding members 117a–117d of FIG. 10 may be fabricated from a fully aromatic polyimide resin such as Vespel from Du Pont Corp. containing 15% by weight of graphite.

These sliding members 117a–117d may be adhered by an epoxy type adhesive to the driving force output members 112a and 112b of the elastic member 112 created with stainless steel such as SUS304 into the shape shown in FIG. 10.

When a vibration is generated in the elastic member 112 and the drive surface 116 (i.e., the relative moving members is driven by applying drive voltage to piezoelectric elements 113 of an ultrasonic actuator 111 fabricated in this manner), the following effects can be achieved.

(1) The shape of elastic member 112 does not change.

(2) The amount of wear caused by friction of the end surfaces of the driving force output members 112a and 112b is extremely small during driving of ultrasonic actuator 111 and performance such as output torque can be maintained with stability for a long period.

(3) The torque generated by the relative moving member 116 being pressed into contact with vibration element 114 is great.

(4) Noise tends not to be generated during driving of the ultrasonic actuator 111.

(5) Driving of ultrasonic actuator 111 is stable.

From the above results, the ultrasonic actuator 111 satisfies all the properties required for an ultrasonic actuator and can contribute sufficiently to practical use.

Eleventh Embodiment

An elastic member 112 of FIG. 10 can be fabricated from stainless steel material such as SUS304. The sliding members 117a–117d may be adhered by an epoxy type adhesive on the end surfaces of the driving force output members 112a and 112b to create the specified shape with the materials (1)'–(4)' enumerated below.

EXAMPLE OF THE PRESENT INVENTION (1)' Fully aromatic polyimide, such as Vespel SP21 from Du Pont Corporation, containing 15% by weight graphite.

COMPARATIVE EXAMPLES (2)' Polyetheretherketone, such as VICTREX 450G from Sumitomo Chemical Co., Ltd.

(3)' Polyphenylene ether such as XYRON X5402 from Asahi Chemical Industry Co., Ltd.

(4)' Polyethersulfone such as SUMIKAEXCEL 4100G from Sumitomo Chemical Co., Ltd.

By applying drive voltage to the piezoelectric elements 113 of the four types of ultrasonic actuators obtained in this manner, vibrations were generated in the elastic members 112 and applied onto the relative moving members 116 made of stainless steel such as SUS304. The coefficients of kinetic friction immediately following initial driving and after ten hours have elapsed, the loss of mass, and motor efficiency after driving have been measured to obtain the following results.

EXPERIMENTAL CONDITIONS

Opposing Material: SUS304
Surface Pressure (Pressure): 30 gf/mm$^2$
Experimental Time: 100 hours
The effects are compiled in Table 6 through Table 8.

TABLE 6

| | Coefficient of Kinetic Friction | |
|---|---|---|
| Material | Immediately After Initial Driving | 10 Hours After Driving |
| 1' | 0.28 | 0.32 |
| 2' | 0.12 | 0.55 |
| 3' | 0.24 | 0.57 |
| 4' | 0.11 | 0.49 |

TABLE 7

| Material | Depth Of Wear($\mu$m) |
|---|---|
| 1' | 8 |
| 2' | 18 |
| 3' | 52 |
| 4' | 49 |

TABLE 8

| Material | Efficiency |
|---|---|
| 1' | 43 |
| 2' | 31 |
| 3' | 11 |
| 4' | 10 |

From FIG. 6 it is clear that material (1)' has a smaller rate of increase of the coefficient of kinetic friction and demonstrates an extremely stable performance compared to the Comparative Examples (2)'–(4)'.

From Table 7, it is clear that material (1)' has a lower depth of wear after ten hours have passed and has an extremely superior abrasion resistance compared to the Comparative Examples (2)'–(4)'.

From Table 8, it is clear that material (1)' has a higher motor efficiency after ten hours have passed and demonstrates superior performance compared to the Comparative Examples (2)'–(4)'.

The confirmation experiments have been performed concerning the compositional ranges of 15% to 40% by weight of graphite and 10% to 15% by weight of polytetrafluoroethylene, and experimental results approximately equal to the test samples of material (1)' in Tables 6–8 were obtained.

Twelfth Embodiment

An elastic member 112 of FIG. 1 may be created from SUS304 in a scanning electron microscope. The sliding members 17a–17d of 0.12 $\mu$m thickness may be fabricated from the three types of materials listed below.

(a) Fully aromatic polyimide resin +15% by weight of graphite.

(b) Electroless Ni-P plating.

(c) PEEK such as VICTREX 450G from Sumitomo Chemical Co., Ltd.

The relative moving members 16 were formed with the three types of materials (a) SUS304, (b) alumite sulfate, and (c) SUS304.

These ultrasonic actuators were driven continuously for sixty minutes and the mass (i.e., the mass of elastic member and the mass of frictional member) of the vibration element before and after driving was examined.

The results are compiled in Table 9.

TABLE 9

| Material | Mass After Driving/Mass Before Driving × 100% |
|---|---|
| a | 99.7% |
| b | 95.5% |
| c | 93.0% |

As shown in Table 9, when the sliding members are made of fully aromatic polyimide resin and graphite, the ultrasonic actuator can be used in a vacuum and furthermore under an electron beam because the chemical bonds are stable and loss of mass is in microscopic quantities. Also, discharge of abrasion powder also is minute.

Thus, an ultrasonic actuator can be provided that can be used in a vacuum and is stable having extremely little wear.

While the invention has been described in relation to preferred embodiments, many modifications and variations are intended to be within the scope of the present invention as defined in the appended claims.

What is claimed is:

1. A vibration actuator comprising:
   a vibration element;
   a relative moving member that performs relative motion between itself and said vibration element; and
   a sliding member composed of a polyethernitrile matrix resin interposed in a contact area of said vibration element and said relative moving member.

2. The vibration actuator of claim 1, wherein the resin includes carbon fiber.

3. The vibration actuator of claim 1, wherein the resin includes polytetrafluoroethylene.

4. The vibration actuator of claim 1, wherein said resin includes both carbon fiber and polytetrafluoroethylene.

5. The vibration actuator of claim 4, wherein the carbon fiber content is 15% to 40% by weight and the polytetrafluoroethylene content is 10% to 15% by weight.

6. The vibration actuator of claim 1, wherein the sliding member is installed on either side of the contact area of said vibration element and said relative moving member, respectively.

7. The vibration actuator of claim 1, wherein a roughness average of said contact area of said relative moving member or said vibration element contacted by said sliding member is less than an amplitude of a vibration generated by said vibration element.

8. The vibration actuator of claim 7, wherein said roughness average is 0.1 $\mu$m to 0.9 $\mu$m.

9. The vibration actuator of claim 1, wherein the vibration element is rectangular parallelepiped shaped and generates both a longitudinal vibration and a bending vibration and said sliding member is provided near an antinode of a bending vibration in the vibration element.

10. The vibration actuator of claim 1, wherein said vibration element is cylindrical and generates both a tortional vibration and a longitudinal vibration, and said sliding member is installed on either side of the contact area of said vibration element and said relative moving member, respectively.

* * * * *